United States Patent
Ou et al.

(10) Patent No.: US 7,691,912 B2
(45) Date of Patent: Apr. 6, 2010

(54) ORMOSIL AEROGELS CONTAINING SILICON BONDED LINEAR POLYMERS

(75) Inventors: Duan Li Ou, Framingham, MA (US); George L. Gould, Mendon, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 1008 days.

(21) Appl. No.: 11/030,395

(22) Filed: Jan. 5, 2005

(65) Prior Publication Data
US 2005/0192367 A1 Sep. 1, 2005

Related U.S. Application Data

(60) Provisional application No. 60/534,803, filed on Jan. 6, 2004.

(51) Int. Cl.
*C08J 9/28* (2006.01)

(52) U.S. Cl. .................. 521/64; 442/394; 442/76; 442/131; 442/77

(58) Field of Classification Search ............. 428/291; 442/394, 76, 131, 77; 521/64
See application file for complete search history.

(56) References Cited

U.S. PATENT DOCUMENTS

| | | | |
|---|---|---|---|
| 4,966,916 A | 10/1990 | Williams | |
| 5,081,163 A | 1/1992 | Pekala | |
| 5,252,654 A | 10/1993 | David | |
| 5,275,796 A | 1/1994 | Tillotson | |
| 5,378,790 A | 1/1995 | Michalczyk | |
| 5,412,016 A | 5/1995 | Sharp | |
| 5,420,168 A | 5/1995 | Mayer | |
| 5,476,878 A | 12/1995 | Pekala | |
| 5,508,341 A | 4/1996 | Mayer | |
| 5,548,051 A | 8/1996 | Michalczyk | |
| 5,868,966 A | 2/1999 | Wei | |
| 5,879,796 A | 3/1999 | David | |
| 6,127,306 A | 10/2000 | Husing | |
| 6,303,046 B1 | 10/2001 | Risen, Jr. | |
| 6,686,035 B2 | 6/2002 | Jiang | |
| 6,566,456 B1 | 5/2003 | Yang | |
| 6,825,260 B2 | 11/2004 | Sievers | |
| 2002/0094426 A1 | 7/2002 | Stepanian | |
| 2003/0192454 A1* | 10/2003 | Lyles et al. | ............ 106/35 |
| 2004/0132846 A1 | 7/2004 | Leventis | |
| 2004/0191516 A1 | 9/2004 | Jiang | |

FOREIGN PATENT DOCUMENTS

JP 2000230073 A2 8/2000
WO WO 9937705 A1 7/1999

OTHER PUBLICATIONS

Kaddami et al et al Mol.elaxation, Pol. For Advanced Technologies, v 8, pp. 101-108(1997).*
Woicik et al Transparent . . . J. of Sol-gel Tech, 57-66 (1995)) herein Woicik.*
Knobbe et al Laser behavior . . . , Applied optics, 13(1990), 2729-2733.*
Reisfeld et al Polym. Adv. Tech, 15,(2004) 291-301.*
Mackenzie et al J. of Sol-gel Tech, 371-377 (1998).*
Aspen Ormosil beads for Insulation of Ground Cryogenic Storage Tank, Proposal summary (http://spacepda.net/abstracts/03/sbir/phase2/SBIR-03-2-F3.02-7942.html , 2003).*
Schmidt, H. *J. Non-Cryst. Solid* (1985) 73:681-691.
Huang, Z.H., et al. *Polymer* (1997) 38(3):521-526.
MacKenzie, J.D., et al. *J. Non-Crystalline Solid* 147 & 148 (1992) 271-279.
Hu, Y, et al. *J. Mater. Science* (1992) 27:4415-4420.
Kramer, S.J., et al. *MRS Proc* (1996) 435:295-300.
Donescu, D., et al. *European Polymer Journal*, (1999) 35:1679-1686.
Mark, et al. *Macromolecules* (1984) 11:2613-2616.
Huang H, et al. *Macromolecules* (1987) 20:1322-1330.
Foussaier, O., et al. *Mater. Lett* (2000) 42:305-310.
J. Fricke et al. *Thin Solid Films* (1997) 297: 212-223.
Li, C. et al. *European Polymer Journal* (2004) 40: 1807-1814.
Wang, Y.T. et al. *Thermochimica Acta* (2003) 397: 219-226.
Harreld, J.H et al. *J. Mater. Chem* (1997) 7 (8): 1511-1517.
Park, J.W et al. *Macromolecules*, (2004) 37: 429-436.
Novak, B.M. et al. *Chem. Mater.* (1994) 6: 282-286.
Wei, Y. et al. *Polym. Adv. Technol.* (2001) 12: 361-368.
Philipp, G, J. et al. *Non-Crystalline Solid* (1984) 63: 283-292.
Ou, D.L et al *Ceramic Tran* (1998) 10: 291-294.
Silveira, K.F et al. *Polymer* (1995) 36(7): 1425-1434.
Gregory, D.M et al. *J. Magnetic Resonance* (1998) 131: 327-335.
Bialon, J.M. et al. *Langmuir* , (2004) 20 :10389-10393.

(Continued)

*Primary Examiner*—James Seidleck
*Assistant Examiner*—Gregory Listvoyb
(74) *Attorney, Agent, or Firm*—Poongunran Muthukumaran (57) ABSTRACT

The invention provides reinforced aerogel monoliths as well as fiber reinforced composites thereof for a variety of uses. Compositions and methods of preparing the monoliths and composites are also provided.

16 Claims, 4 Drawing Sheets

OTHER PUBLICATIONS

Moudrakovski, I.L. Et al. *J. Am. Chem. Soc* (2004) 126: 5052-5053.
Coltrain, B.K et al. *Chem. Mater.* (1993) 5:1445-1455.
Husing, N. *Angew. Chem. Int Ed.* (1998) 37: 22-45.
Sassi, Z *Vib. Spectroscopy* (2002) 28: 251-262.
Huang, H.H. et al. *Polymer*, (1989) 30: 2001- 2012.
Yu, Y.Y. et al. *Polymer*, ( 2003) 44: 593-601.
Chen, W.C. et al. *Polym. J.* (2000) 32(1):67-72.
Casu, M et al. *J. Non-Crystalline Solid* (2003) 315: 97-106.
Rodrigues, D.E. et al. *Chem. Mater.* (1992) 4: 1437-1446.
Wen, J. et al. Chem. Mater. (1997) 9: 1968-1971.
Jordens, K. et al. J.M.S—Pure Appl. Chem., A(2000)37(3): 177-203.

* cited by examiner

Jeffamine T series :

ORMOSIL AEROGELS CONTAINING SILICON BONDED LINEAR POLYMERS

CROSS-REFERENCES TO RELATED APPLICATIONS

This application claims benefit of priority from U.S. Provisional Patent Application 60/534,803, filed Jan. 6, 2004, which is hereby incorporated in its entirety as if fully set forth.

FIELD OF THE INVENTION

The inventions described herein relate to producing solvent filled, nanostructured gel monolith and flexible blanket composite sheet materials. These materials become nanoporous aerogel bodies after all mobile phase solvents are extracted via a process such as hypercritical solvent extraction (supercritical fluid drying). Formulations and manufacturing processes relating to the composites and aerogel bodies are provided, along with methods of using them based on their improved mechanical properties.

BACKGROUND OF THE INVENTION

Aerogels describe a class of material based upon their structure, namely low density, open cell structures, large surface areas (often 900 $m^2/g$ or higher) and sub-nanometer scale pore sizes. Supercritical and subcritical fluid extraction technologies are commonly used to extract the fluid from the fragile cells of the material. A variety of different aerogel compositions are known and they may be inorganic, organic and inorganic/organic hybrid (see N. Hüsing and U Schubert, Angew. Chem. Int. Ed. 1998, 37, 22-45). Inorganic aerogels are generally based upon metal alkoxides and include materials such as silica, carbides, and alumina. Organic aerogels include, but are not limited to, urethane aerogels, resorcinol formaldehyde aerogels, and polyimide aerogels. Organic/inorganic hybrid aerogel were mainly organically modified silicate (organically modified silica or "ormosil"). The organic components are covalently bonded to the silica network. In other words, the organic and inorganic phase are chemically bonded to each other in the inorganic/organic hybrid aerogels.

Low-density aerogel materials (0.01-0.3 g/cc) are widely considered to be the best solid thermal insulators, better than the best rigid foams with thermal conductivities of 10 mW/m-K and below at 100° F. and atmospheric pressure. Aerogels function as thermal insulators primarily by minimizing conduction (low density, tortuous path for heat transfer through the solid nanostructure), convection (very small pore sizes minimize convection), and radiation (IR absorbing or scattering dopants are readily dispersed throughout the aerogel matrix). Depending on the formulation, they can function well at cryogenic temperatures to 550° C. and above. Aerogel materials also display many other interesting acoustic, optical, mechanical, and chemical properties that make them abundantly useful. The methods described in this invention represent advances in gel formations that will facilitate production and improved properties of these aerogel materials.

Low-density insulating materials have been developed to solve a number of thermal isolation problems in applications in which the core insulation experiences significant compressive forces. For instance, polymeric materials have been compounded with hollow glass microspheres to create syntactic foams, which are typically very stiff, compression resistant materials. Syntactic materials are well known as insulators for underwater oil and gas pipelines and support equipment. Syntactic materials are relatively inflexible and of high thermal conductivity relative to flexible aerogel composites (aerogel matrices reinforced by fiber). Aerogels can be formed from flexible gel precursors. Various flexible layers, including flexible fiber-reinforced aerogels, can be readily combined and shaped to give pre-forms that when mechanically compressed along one or more axes, give compressively strong bodies along any of those axes. Aerogel bodies that are compressed in this manner exhibit much better thermal insulation values than syntactic foams. Methods to improve performance of these materials such as density, thermal conductivity and dustiness will facilitate large-scale use of these materials in underwater oil and gas pipelines as external insulation.

Silica aerogel monolith will find use as insulating transparencies, such as double-glazing windows in buildings. Because these gel materials are normally stiff and inflexible when they are composed of a ceramic or cross-linked polymer matrix material with intercalated solvent (gel solvent) in the absence of fiber reinforcement, these materials need to be handled with great care.

Although the diffusion of polymer chains and subsequent solid network growth are significantly slowed within the viscous gel structure after the gelation point, the maintenance of the original gel liquid (mother liquor) for a period of time after gelation is essential to obtaining an aerogel that has the best thermal and mechanical properties. This period of time that the gel "ages" without disturbance is called "syneresis". Syneresis conditions (time, temperature, pH, solid concentration) are important to the aerogel product quality.

Conventional methods for gel monolith and/or fiber-reinforced composite gel production formed via sol-gel chemistry described in the patent and scientific literature invariably involve batch casting. Batch casting is defined herein as catalyzing one entire volume of sol to induce gelation simultaneously throughout that volume. Gel-forming techniques are well-known to those trained in the art: examples include adjusting the pH and/or temperature of a dilute metal oxide sol to a point where gelation occurs (R. K. Iler, Colloid Chemistry of Silica and Silicates, 1954, chapter 6; R. K. Iler, The Chemistry of Silica, 1979, chapter 5, C. J. Brinker and G. W. Scherer, Sol-Gel Science, 1990, chapters 2 and 3). Suitable materials for forming inorganic aerogels are oxides of most of the metals that can form oxides, such as silicon, aluminum, titanium, zirconium, hafnium, yttrium, vanadium, and the like. Particularly preferred are gels formed primarily from alcohol solutions of hydrolyzed silicate esters due to their ready availability and low cost (alcogel).

It is also well known to those trained in the art that organic aerogels can be made from melamine formaldehydes, resorcinol formaldehydes, and the like (see for instance N. Hüsing and U Schubert, Angew. Chem. Int. Ed. 1998, 37, 22-45).

The availability of fiber reinforced aerogel composites opened up many application areas for aerogel materials. Since large pieces of aerogel composite materials have been successfully manufacture by this method, which can be widely used in all type of thermal and acoustic insulation applications. Yet it is inherently impossible to produce transparent aerogel composite, due to the presence of macro scale phase separation in these materials. A different reinforcement method is needed to produce stronger transparent aerogel monoliths, for the other insulation applications such as insulating transparencies in double glazing windows. In the past two decades, many investigators have attempted to improve the mechanical properties of silica in order to reduce its tendency to crack during the formation of its monoliths, by the incorporation of a secondly polymeric phase directly bonded to silica network. These led to the formations of numerous ormosil type of inorganic organic hybrid materials. Some of the most noticeable examples are as follows:

H. Schmidt, J. Non-Cryst. Solid, 73, 681, 1985, reported the incremental improvement of the mechanical properties of silica xerogel by the incorporation of PMMA or epoxy based polymer.

Mackenzie, et. al. J. Non-Crystalline solid 147&148 (1992), 271-279, J. Mater. Science, 27, (1992), 4415-4420, Mark, et al. Macromolecules, (1984), 11, 2613-2616, Macromolecules, 20, (1987), 1322-1330, O. Foussaier, M. Menetrier, J. Videau, E. Duguet, Mater. Lett. 42, 305, 2000, reported the improvement of the tensile properties of silica xerogel, by the incorporation of polydimethylsiloxane (PDMS) linear polymer.

H. Huang, G. L. Wilkes and J. G. Carlson, Polymer, 30, 1989, 2001-2012, reported the improvement on the tensile properties of silica xerogel by the incorporation of polyurethane linear polymer in the silioxane network.

It has been claimed that linear polymer such as PDMS appear to increase the flexible properties of the rigid silica aerogels. (S. J. Kramer, F. Rubio-Alonso and J. D. Mackenzie, MRS Proc. Vol 435, 295-300, 1996).

To distinguish between aerogels and xerogels, it is pointed out that aerogels are a unique class of materials characterized by their low densities, high pore volumes, and nanometer pore sizes. Because of the high pore volumes and nanometer pore sizes of aerogels, they typically have high surface areas and low thermal conductivities. The high porosity leads to a low solid thermal conductivity, and the nanometer pore sizes cause partial suppression of gaseous thermal conduction because the cells are smaller than the mean free path of gases. This structural morphology of an aerogel is a major advantage in thermal insulation applications. For instance, thermal conductivities have been measured to be less than 20 mW/m·K (J. Fricke and T. Tillotson, Thin Solid Films, 297 (1997) 212-223), and sometimes as low as 10-12 mW/m·K, at ambient conditions for silica aerogels. Thermal conductivities as low as 8-10 mW/m·K for organic aerogels (such as those composed of resorcinol-formaldehyde) have been measured. (R. W. Pekala and L. W. Hrubesh, U.S. Pat. No. 5,731,360). This is in sharp contrast to xerogels, which have higher densities than aerogels and are used as a coating such as a dielectric coating.

The sol-gel process has been used to synthesize a large variety of inorganic and hybrid inorganic-organic xerogels, aerogels and nanocomposite materials. Relevant precursor materials for silica based aerogel synthesis include, but are not limited to, sodium silicates, tetraethylorthosilicate (TEOS), tetramethylorthosilicate (TMOS), monomeric alkylalkoxy silanes, bis trialkoxy alkyl or aryl silanes, polyhedral silsesquioxanes, and others. Various polymers have been incorporated into silica gels to improve mechanical properties of the resulting gels, xerogels (see J. D. Mackenzie, Y. J. Chung and Y. Hu, J. Non-Crystalline solid 147&148 (1992), 271-279; and Y. Hu and J. D. Mackenzie. J. Mater. Science, 27, (1992)), and aerogels (see S. J. Kramer, F. Rubio-Alonso and J. D. Mackenzie, MRS Proc. Vol 435, 295-300, 1996). Aerogels are obtained when the gels are dried in a manner that does not alter or causes minimal changes to the structure of the wet gel. This is typically accomplished by removing the solvent phase from the gel above the critical point of the solvent or mixture of solvents if a co-solvent is used to aid the drying process.

Wet gels frequently exhibit structures with mass fractal features consisting of co-continuous solid and pore liquid phases where the pore liquid phase can occupy as much as 98% of the sample volume. Aerogels have structures that are very similar to that of the original gel because they are dried by supercritical processes that minimize or eliminate capillary forces that cause the gel structure to collapse. The structure of xerogels, in contrast, is significantly modified during drying due to the capillary forces acting on the solid network during the evaporative drying process. The magnitude of the capillary pressure exerted on the solid network during evaporation is inversely proportional to pore dimensions (e.g. pore radius), and thus can be extremely large when pore features are in the nanometer ($10^{-9}$ meters) range. These surface tension forces created during evaporative drying cause the gel network to fold or condense during xerogel manufacture as the coordination number of the particles increases.

Stated differently, a xerogel is formed upon conventional drying of wet gels, that is by increase in temperature or decrease in pressure with concomitant large shrinkage (and mostly destruction) of the initially uniform gel body. This large shrinkage of a gel body upon evaporation of the pore liquid is caused by capillary forces acting on the pore walls as the liquid retreats into the gel body. This results in the collapse of the filigrane, the highly porous inorganic network of the wet gels. Collapse of the structure stops when the gel network becomes sufficiently strong to resist the compressive forces caused by the surface tension.

The resulting xerogel typically has a close packing globular structure and no larger pores observable by TEM, which suggests that they are space filling. Thus the dried xerogel structure (which comprises both the skeletal and porous phases) is a contracted and distorted version of the original wet gel's structure. Because of the difference in drying procedures, xerogels and aerogels have very different structures and material properties. For instance, the number of reactive groups directly associated with a typical Si atom is significantly higher on average in an aerogel structure (dried supercritically) than in the corresponding xerogel structure made with the same starting formulation but dried evaporatively. Stated differently, the solutions or mixtures generally used to prepare a xerogel cannot be used to prepare an aerogel simply by altering the drying conditions because the resultant product will not automatically have a density of an aerogel. Thus there are fundamental compositional differences between xerogels and aerogels that greatly affects their surface area, reactivity, pore volume, thermal conductivity, compressibility, mechanical strength, modulus, and many other properties.

Thus compared to xerogels, aerogels are expanded structures that often more closely resemble to the structure of wet gel. TEM micrographs of aerogels often reveal a tenuous assemblage of clusters that bound large interstitial cavities. Porosity measurement by nitrogen sorption also reveals the structural difference in nanometer size level, compared to the corresponding xerogel, the aerogel often contains over twice the pore volume and average the pore size is considerably greater as is evident from the larger amount of adsorption that occurs at high relative pressures (>0.9). See C. J. Brinker and G. W. Scherer, *Sol-Gel Science*, 1990, Chapter 9. Due to the structural difference between aerogel and xerogels, there is significant difference in the physical properties of these two classes of materials, such as dielectric constant, thermal conductivities, etc. Therefore, and even if of identical elemental composition, an aerogel and its corresponding xerogel are completely different materials, somewhat analogous to sugar granules and cotton candy, both of which are composed of the same sugar molecules.

Citation of documents herein is not intended as an admission that any is pertinent prior art. All statements as to the date or representation as to the contents of documents is based on the information available to the applicant and does not constitute any admission as to the correctness of the dates or contents of the documents.

BRIEF SUMMARY OF THE INVENTION

The present invention provides methods for producing solvent filled, nanostructured gel monolith as well as flexible blanket composite sheet materials produced therefrom via fiber reinforcement. The composite sheets result after all mobile phase solvents are extracted using a hypercritical solvent extraction (supercritical fluid drying). This novel organically modified silica (sometimes referred to as an "ormosil") formulation can lead to the improvement of various physical and mechanical properties in the resulting aerogel monolith and aerogel composite.

The ormosil matrix materials described in this invention are best derived from sol-gel processing, preferably composed of polymers (inorganic, organic, or inorganic/organic hybrid) that define a structure with very small pores (on the order of billionths of a meter). Fibrous materials added prior to the point of polymer gelation reinforce the matrix materials described in this invention. The preferred fiber reinforcement is preferably a lofty fibrous structure (batting or web), but may also include individual randomly oriented short microfibers, and woven or non-woven fibers. More particularly, preferred fiber reinforcements are based upon either organic (e.g. thermoplastic polyester, high strength carbon, aramid, high strength oriented polyethylene), low-temperature inorganic (various metal oxide glasses such as E-glass), or refractory (e.g. silica, alumina, aluminum phosphate, aluminosilicate, etc.) fibers.

Thus in a first aspect, the invention provides ormosil aerogels containing a linear polymer as a reinforcing component within the structure of the aerogel. The preferred embodiment is to have the polymer covalently bonded to the inorganic structures. The present invention is thus based on the linear polymer reinforcement concept. A number of different linear polymers have been incorporated into the silica network to improve the mechanical properties of the resulting ormosils. Transparent monoliths more compliant than silica aerogels have been produced. They are strong enough to resistant the tendency of cracking during wet gel handling and extraction. The improvement in elasticity of these ormosil materials also improve the flexibility and reduce its dustiness in its fiber-reinforced composite. The formulation describe in this invention thus improves the flexibility of the gel monolith, which will lead to the improvement on the handling of monolith during aerogel productions.

The invention thus provides for the incorporation of flexible nano reinforcement component into silica network to improve the tensile properties of the resulting aerogel monolith. This reduces the chance of cracking caused by the brittleness of silica. The improvement of the elasticity of silica aerogel will also reduce its tendency to break apart from the fiber in the fiber reinforcement composite aerogel, leading to the reduction of dustiness of the aerogel composite material.

Figure 1:
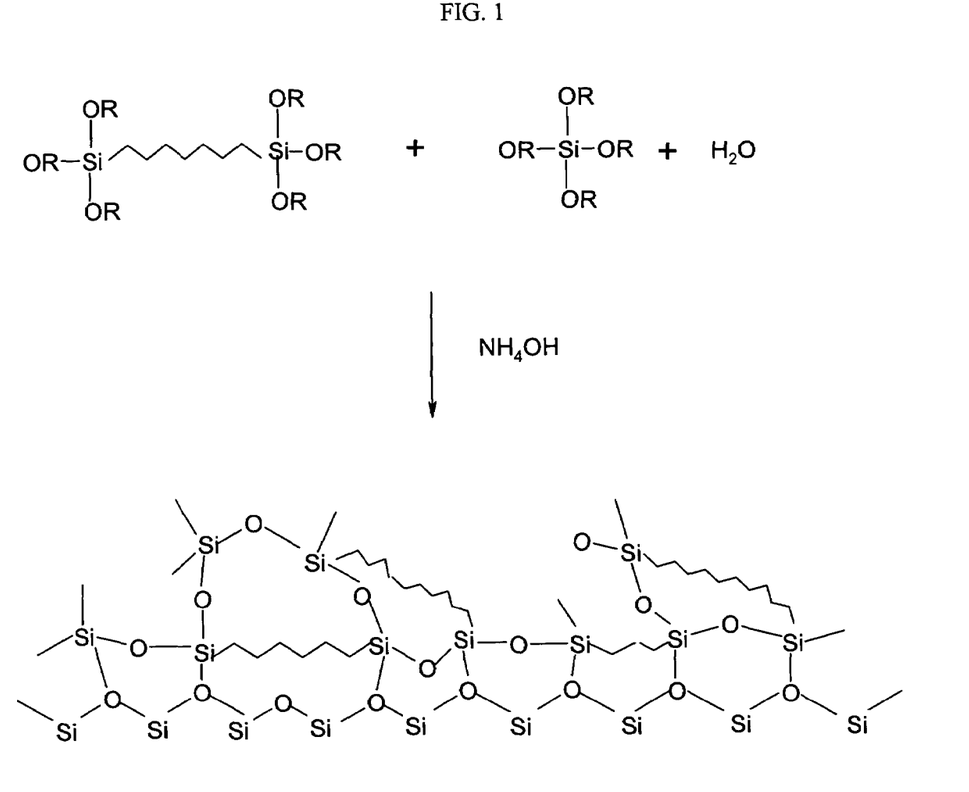
FIG. 1 illustrates a reaction scheme for co-condensation of trialkoxysilyl terminated linear polymer and tetraalkoxysilane.

In another aspect, the present invention provides a method for co-condensation of trialkoxysilyl end capped linear polymer with a silica precursor, such as (but not limited to) hydrolyzed tetraalkoxysilane, via a sol-gel process. The flexible linear polymeric chain is thus covalently bonded into the rigid silica network, as illustrated in FIG. 1. The introduction of the organic polymeric phase will not lead to phase separation in the resulting ormosil gel. Unlike most ormosil materials, this ormosil gel with low polymer content (<20%) will remain optically transparent after $CO_2$ supercritical extraction. The improved flexibility of the family of ormosil gels provided by the present invention will improve the ease of handling their monolith counterparts during the preparation process, and reduce to tendency of cracking during $CO_2$ extraction.

In a further aspect, the invention also provides a method for making a linear polymer bonded ormosil fiber reinforced flexible composite. The introduction of silicon bonded linear polymers further increases the flexibility of the resulting aerogel composite. The dustiness of the silica aerogel composite caused by the brittleness of silica material can also be reduce significantly in this case, without sacrificing other inherent properties of the aerogel materials, such as low thermal conductivity and low density.

Thus the invention provides an organically modified silica (ormosil) aerogel composition comprising an ormosil aerogel reinforced with linear polymer (or linear polymer chains). Such a composition has a linear polymer covalently bonded at one or both ends to the silica network of the aerogel through a C—Si bond between a carbon atom of the polymer and a silicon atom of the network. The polymer may be covalently bonded at both ends to one silicon containing molecule of the network, and thus be intramolecularly linked, or covalently bonded at the two ends to two separate silicon containing molecules of the network, and thus be intermolecularly linked. The invention of course includes compositions with both intramolecularly and intermolecularly linked polymers. An aerogel of the invention preferably has a density from about 0.01 to about 0.3 g/cc, preferably about 0.02, or about 0.05, or about 0.1, or about 0.15 or about 0.2, or about 0.25 g/cc.

The linear polymer chains are trialkoxysilylterminated and may be a member of the polyether family or selected from trialkoxysilylterminated polydimethylsiloxane, polyoxyalkylene, polyureane, polybutadiane, polyoxypropylene, or polyoxylpropylene-copolyoxyethylene. Stated differently, the linked linear polymer may be generated from a trialkoxysilyl terminated polydimethylsiloxane, trialkoxysilyl terminated polyoxyalkylene, trialkoxysilyl terminated polyurethane, trialkoxysilyl terminated polybutadiene, trialkoxysilyl terminated polyoxypropylene, trialkoxysilyl terminated polyoxypropylene-copolyoxyethylene, or trialkoxysilyl terminated members of the polyether family.

The alkoxy groups in the terminal trialkoxysilyl moieties contain less than about 4 carbons. Thus the alkoxy groups in the terminal trialkoxysilyl moieties are preferably selected from methoxy, ethoxy, propoxy, or butoxy.

The chain lengths have an average molecular weight ranging from about 200 to about 1,000,000 or from about 300 to about 10,000 or from about 400 to about 9000 or from about 500 to about 8000 or from about 600 to about 7000 or from about 700 to about 6000 or from about 800 to about 5000 or from about 900 to about 4000 or from about 1000 to about 3000 or about 2000. The weight percentage of the polymer chains may range (w/w) from about 1 to about 49 or 50%, about 3 to about 30%, about 5 to about 25%, about 7 to about 20%, about 9 to about 15%, or about 10 to about 13%. Preferred embodiments have less than 50%, such as from about 1 to less than 50%, about 1 to about 45%, about 1 to about 40%, about 1 to about 35%, about 1 to about 30%, about 1 to about 25%, about 1 to about 20%, about 1 to about 15%, about 1 to about 10% or about 1 to about 5%.

The invention also provides a method of preparing an aerogel composition of the invention by reacting a trialkoxysilyl terminated linear polymer with a silica precursor at ambient temperature and conditions as described herein. Preferably, the trialkoxysilyl terminated linear polymer is prepared by a method comprising reacting 3-isocyanatopropyl triethoxylsilane with an amino (NH) terminated linear polymer in a suitable solvent at ambient temperature. Solvents free of OH or NH moieties are preferred. Examples of the solvent include THF, ether dioxane and others Anhydrous alcohols can be used in limited cases where the resulting product are to be used in a short period of time. The concentration of the 3-isocyanatopropyl triethoxylsilane is at least about 1% w/w, but preferably higher than about 50% w/w, which allows for a fast reaction at ambient temperature. Preferred amine terminated linear polymers include amine terminated polyoxyethylene-co-polyoxypropylene, amine terminated polyoxyethylene, and amine terminated polyoxypropylene.

Additionally, the invention provides a method of preparing trialkoxysilyl terminated linear polymer, by reacting 3-glycidoxypropyl triethoxylsilane with NH terminated linear polymer in a non-reactive solvent. Hydrocarbon solvents free of OH or NH moieties are the preferred solvents for the reaction. The NH terminated linear polymer is preferably an amine terminated polyether such as amine terminated polyoxyethelene-co-polyoxylpropylene, amine terminated polyoxyethelene, or amine terminated polyoxylpropylene.

Moreover, the invention provides a method of preparing trialkoxysilyl terminated linear polymer, by reacting 3-isocyanatopropyl triethoxylsilane with OH terminated linear polymer in a suitable solvent. Hydrocarbon solvents free of OH or NH moieties are the preferred solvents for the reaction. The OH terminated linear polymer may be, but is not limit to, dihydroxyl terminated polybutadiene, polyethylene glycol, polypropylene glycol. The concentration of the 3-isocyanatopropyl triethoxylsilane is at least about 1% w/w, but preferably higher than about 50% w/w, which allows for a fast reaction at ambient temperature. Preferred hydroxy terminated linear polymers include dihydroxyl terminated polybutadiene, polyethylene glycol, and polypropylene glycol.

The invention further provides a method of preparing trialkoxysilyl terminated linear polymer, by reacting aminopropyl triethoxylsilane or aminopropyl trimethoxylsilane with isocyanate terminated linear polymer in a non-reactive solvent. Hydrocarbon solvents free of OH or NH moieties are the preferred solvents for the reaction. The isocyanate terminated linear polymer may be, but is not limited to, polyhexamethylene diisocyanate and polymethyldiphenyldiisocyanate.

Further still, the invention provides a method of co-condensing trialkoxysilyl terminated linear polymer with a silica precursor, such as, but not limited to, hydrolyzed tetramethoxysilane. The method may be advantageously used to prepare a transparent, or translucent (incompletely transparent) aerogel as described below. A transparent ormosil gel monolith with about 1 to about 20 weight % (preferably about 5 to about 10%) loading of linear polymer was formed after the addition of condensation catalyst, according to the scheme illustrated in FIG. 1. The catalyst may be $NH_4OH$, $NH_4F$, HF, or HCl as non-limiting examples. The monolith remains transparent after $CO_2$ supercritical extraction. Non-limiting examples of the silica precursor include alkoxysilanes and partially hydrolyzed alkoxysilanes. The alkoxysilane may be selected from tetraethoxylsilane, tetramethoxysilane, and tetra-n-propoxysilane as non-limiting examples. Partially hydrolyzed alkoxysilanes include, but are not limited to, Silbond H5, Silbond 40 and its product family; Dynasil 40 and its family product.

The highly transparent material has up to 90% or more transmittance in the visible spectrum for thicknesses between 0.5 and 1.5 cm. The composition would include a linear polymer as described herein without decreasing the optical quality of the resulting aerogel. Preferably, the weight % of linear polymer should be less than about 30%, less than about 25%, less than about 20%, less than about 15%, less than about 10%, or less than about 5% in the composition. The resultant highly transparent monolith may have high recovery strain up to 95% or more (or up to about 90% or more, or up to about 85% or more) under 20% compression. The improved compressive and flexural resilience of the gel compositions described by the invention allow for creation of larger crack free monolithic structures compared to pure silica aerogel produced under the same processing conditions. This improvement offers a significant advantage for producing crack-free transparencies such as insulated window inserts between glazings and the like. Preferably, such an aerogel of the invention has thermal conductivity between about 10 and about 16 mW/m·K under ambient conditions In a typical silica aerogel, silica networks when exposed to normal mechanical handling conditions can disintegrate to a small extent making the resultant aerogel product dusty. The invention thus further provides a gel composition which is less dusty under mechanical handling conditions compared to silica aerogel. The polymer grafted silica aerogel material may also be fiber reinforced, with low dust properties and thermal conductivity between about 10 to about 16 mW/m·K (including about 11, about 12, about 13, about 14, and about 15 mW/m·K).

The details of one or more embodiments of the invention are set forth in the accompanying drawings and the description below. Other features, objects, and advantages of the invention will be apparent from the drawings and detailed description, and from the claims.

DETAILED DESCRIPTION OF MODES OF PRACTICING THE INVENTION

The linear polymer for use in the present invention includes, but is not limited to, trialkoxylsilyl terminated polydimethosiloxane, polyether, polyethylene, polypropylene, polyester, polyurethane, polyalcohol, polybutadiene, etc.

There are multiple ways to terminate, or end cap, linear polymer with trialkoxysilyl functions. As a non-limiting example, SiH terminated polydimethysiloxane can react with vinyltrialkoxysilane in the presence of Pt catalyst to form trialkoxysilyl terminated polydimethysiloxane, similarly, Si-Vinyl terminated polydimethysiloxane can react with trichlorosilane under the presence of Pt catalyst to form trialkoxysilyl terminated polydimethysiloxane.

Linear polymer chains may be end capped with trialkoxysilyl functions through the formation of polyurea linkages as part of the present invention. Polyhexamethylene diisocyanate (PHDI) was reacted with 3-aminopropyltrimethoxylsilane or 3-aminopropyltriethoxysilane to form trialkoxysilyl terminated polyhexamethylene. Polymethyldiphenyldiisocyanate (PMDI) was reacted with 3-aminopropyltrimethoxylsilane or 3-aminopropyltriethoxysilane to form trialkoxysilyl terminated Polymethyldiphenyllene.

An OH terminated polymer chain such as one of the polyol family can be end capped by trialkoxysilane, via reaction with 3-isocyanatopropyltriethoxysilane. The polyol family includes, but is not limited to, dihydroxyl terminated polybutadiene, polyethylene glycol, and polypropylene glycol.

Figure 2:
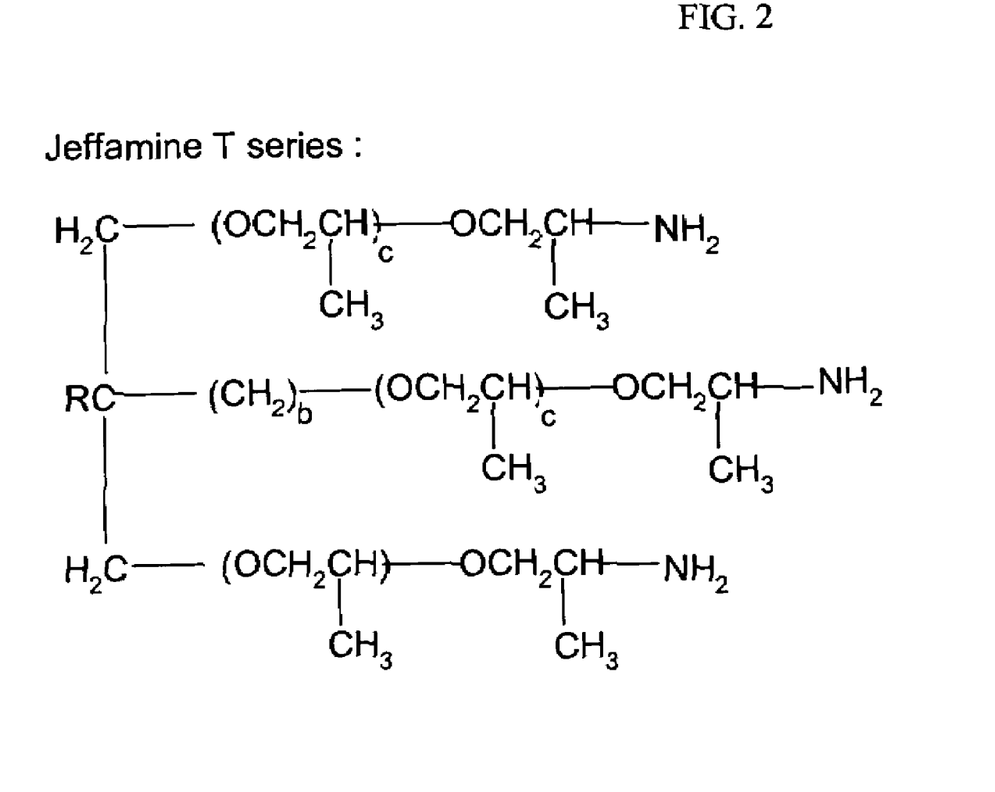
FIG. 2 illustrates the general structure of the Jeffamine family of amine terminated polyethers.

Amine terminated polyethers were used herein as non-limiting examples. This class of linear polymers are commercially available from Huntsman corporation under the trade name of Jeffamine® series of products. The general structure for these polyethers is illustrated in FIG. 2. The amine groups are situated in both ends of the polyether chain. In the multi-amine substituted polyether JeffamineT series, additional amine groups will graft as a side group on the polyether chain, as well as end capped in both ends of the polyether chain. The average molecular weight of these amine terminated polyethers are from about 100 to about 1,000,000. Preferred molecular weights for use in the invention are in the range of about 50 to about 10,000 (while molecular weights of about 100, about 500, about 1000, about 2000, about 4000, and about 8000 may also be used). Amine terminated polyoxypropylenes with 2000 and 4000 weight average molecular weight (Jeffamine® D2000 and Jeffamine® XTJ-510), and amine terminated polyoxyethlene-co-polyoxypropylenes with 600 weight average molecular weight (Jeffamine® XTJ500) were used for the preparations as illustrated in some of the examples below.

Figure 3:
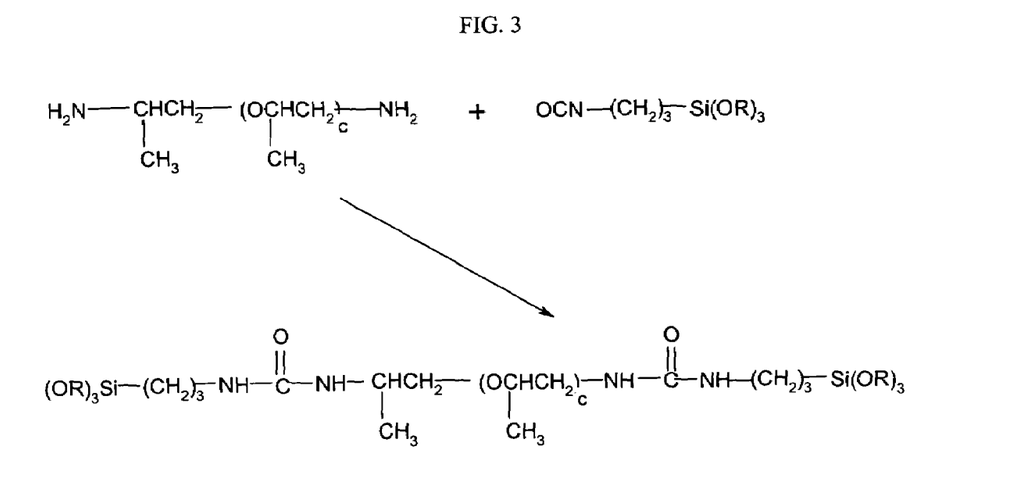
FIG. 3 illustrates a reaction scheme for formation of trialkoxysilyl terminated polyoxypropylene.

3-Glycidoxypropyltrimethoxysilane and 3-Isocyanatopropyl triethxoylsilane are used in the present invention to convert the terminating amine group into triethoxysilyl moieties. 3-Isocyanatopropyl triethxoylsilane was used for the production of many of the examples herein. In this case, a urea bridge was formed to ensure the polyether chains of variable lengths were grafted to the sol-gel active triethoxysilyl group. The reaction between 3-isocyanatopropyl triethxoylsilane and amine terminated polyether is illustrated in FIG. 3. OH or NH free anhydrous ether, THF, hexane, dioxane, toluene, pentane, benzene were used as described herein for this reaction, with THF and dioxane as preferred solvents.

The above urea formation was conducted at room temperature within 1 hour. The completion of this reaction is detectable by IR spectroscopy as the disappearance of the isocyanate band at 2274 cm$^{-1}$.

To ensure a fast reaction at ambient temperature, the reactant concentration in THF solution should be in the range between about 5 to about 95%, preferably from about 40 to about 70%, about 50 to about 60%, or about 55%.

Generally the principal synthetic route for the formation of an ormosil (organically modified silica) aerogel is the hydrolysis and condensation of an appropriate silicon alkoxide, together with an organotrialkoxysilane. The most suitable silicon alkoxides are those having about 1 to about 6 carbon atoms, preferably from 1 to about 3 carbon atoms in each alkyl group. Specific examples of such compounds include tetraethoxysilane (TEOS), tetramethoxysilane (TMOS), and tetra-n-propoxysilane. These materials can also be partially hydrolyzed and stabilized at low pH as polymers of polysilicic acid esters such as polydiethoxysiloxane. These materials are commercially available in alcohol solution, for example Silbond®40, Silbond®25, Silbond® H5. Higher molecular weight silicone resin can also be used in this ormosil formulation. The silicone resin includes, but is not limit to, Dow Corning Fox series, Dow Corning Z6075, Dow Corning MQ, etc. Due to the presence of the highly reactive trialkoxysilyl end group, the co-condensation of these linear polymers with silica precursor was very effective, no additional energy such as heat and other form of radiation is needed to assist the incorporation of this linear polymer into the silica network.

It is understood to those skilled in the art that gel materials formed using the sol-gel process can be derived from a wide variety of metal oxide or other polymer forming species. It is also well known that sols can be doped with solids (IR opacifiers, sintering retardants, microfibers) that influence the physical and mechanical properties of the gel product. Suitable amounts of such dopants generally range from about 1 to about 40% by weight of the finished composite, preferably about 2 to about 30% using the casting methods of this invention.

Variable parameters in the ormosil aerogel formation process include the type of alkoxide, solution pH, and alkoxide/alcohol/water ratio, and the mole ratio of the organotrialkoxysilane/silica precursor. Control of the parameters can permit control of the growth and aggregation of the matrix species throughout the transition from the "sol" state to the "gel" state. While properties of the resulting aerogels are strongly affected by the mole ratio of the organotrialkoxysilane/silica precursor, any molar ratio that permits the formation of gels may be used in the present invention.

Generally, the solvent will be a lower alcohol, i.e. an alcohol having 1 to 6 carbon atoms, preferably 2 to 4, although other equivalent solvents can be used as is known in the art. Examples of other useful liquids include, but are not limited to, ethyl acetate, ethyl acetoacetate, acetone, dichloromethane, and the like.

For convenience, the alcogel route of forming ormosil gels and composites is provided below as a representative embodiment to illustrate how to create the precursors utilized by the invention. This is not intended to limit the present invention to the incorporation of any specific type of linear polymer into silica network. The invention is applicable to other ormosils with other similar concept structures.

After identification of the gel material to be prepared using the methods of this invention, a suitable silica alkoxide/triethoxylsilyl grafted polyether linear alcohol solution is prepared. The preparation of silica aerogel-forming solutions is well known in the art. See, for example, S. J. Teichner et al, Inorganic Oxide Aerogel, Advances in Colloid and Interface Science, Vol. 5, 1976, pp 245-273, and L. D. LeMay, et al., Low-Density Microcellular Materials, MRS Bulletin, Vol. 15, 1990, p 19. For producing ormosil gel monoliths, typically preferred ingredients are tetramethoxysilane (TMOS), triethoxysilyl grafted linear polyether (TESGP) water, and methanol (MeOH). The preferred ratio of TMOS to water is about 0.2 to about 10:1, the preferred ratio of TMOS to MeOH is about 0.02 to about 0.5:1, and the preferred TMOS/TESGP ratio is about 1 to about 10/1. The natural pH of a solution of the ingredients is about 5. While any acid may be used to obtain a lower pH solution, HCl, $H_2SO_4$ or HF are preferred acids. To generate a higher pH, $NH_4OH$ is the preferred base.

A transparent ormosil gel monolith with about 1 to about 20-weight % loading of linear polyether was formed after the addition of condensation catalyst. The catalyst may be $NH_4OH$, $NH_4F$, HF, or HCl as non-limiting examples. The monolith will remain transparent after $CO_2$ supercritical extraction. The resulting ormosil aerogel monoliths have density range from about 0.05 to about 0.30, and thermal conductivity range from about 12 to about 16 mW/m·K. The maximum dimension of transparent crack-free ormosil aerogel monolith was 11.5×11.5×0.5 (inches) with multiple smaller volumes that were crack-free. The highly transparent material has up to 90% or more transmittance in the visible spectrum for thicknesses between 0.5 and 1.5 cm For fiber-reinforced containing ormosil aerogel composites, pre-polymerized silica precursors (e.g. Silbond® 40 and its family) are preferred as the silica precursor. The effect of the other variation factors is similar to those in the preparation of ormosil monoliths.

As used herein, a lofty batting is defined as a fibrous material that shows the properties of bulk and some resilience (with or without full bulk recovery). Non-limiting examples of lofty battings that may be used are described in published U.S. Patent Application document US 2002/0094426. In preferred embodiments of the invention, a batting for use in the present invention is "lofty" if it contains sufficiently few individual filaments (or fibers) that it does not significantly alter the thermal properties of the reinforced composite as compared to a non-reinforced aerogel body of the same material. Generally, and upon looking at a cross-section of a final aerogel composite comprising such batting, the cross-sectional area of the fibers is less than about 10% of the total surface area of that cross section, preferably less than about 8%, and most preferably less than about 5%.

The preferred form is a soft web of this material. The use of a lofty batting reinforcement material minimizes the volume of unsupported aerogel while avoiding substantial degradation of the thermal performance of the aerogel. Batting preferably refers to layers or sheets of a fibrous material, commonly used for lining quilts or for stuffing or packaging or as a blanket of thermal insulation.

Batting materials that have some tensile strength are advantageous for introduction to the conveyor casting system, but are not required. Load transfer mechanisms can be utilized in the process to introduce delicate batting materials to the conveyor region prior to infiltration with prepared sol flow.

Suitable fibrous materials for forming both the lofty batting and the x-y oriented tensile strengthening layers include any fiber-forming material. Particularly suitable materials include: fiberglass, quartz, polyester (PET), polyethylene, polypropylene, polybenzimid-azole (PBI), polyphenylenebenzo-bisoxasole (PBO), polyetherether ketone (PEEK), polyarylate, polyacrylate, polytetrafluoroethylene (PTFE), poly-metaphenylene diamine (Nomex), poly-paraphenylene terephthalamide (Kevlar), ultra high molecular weight polyethylene (UHMWPE) e.g. Spectra™, novoloid resins (Kynol), polyacrylonitrile (PAN), PAN/carbon, and carbon fibers.

Having now generally described the invention, the same will be more readily understood through reference to the following examples which are provided by way of illustration, and are not intended to be limiting of the present invention, unless specified.

EXAMPLES

Further details and explanation of the present invention may be found in the following non-limiting specific examples, which describe the manufacture of silicon boned linear polymer containing ormosil aerogel monoliths and fiber reinforced aerogel composites in accordance with the present invention and test results generated there from. All parts and percents are by weight unless otherwise specified.

The following non-limiting examples are provided so that one skilled in the art many more readily understand the invention. In the examples weights are expressed as grams (g).

Molecular weight is reported as weight average molecular weight (Mw) provided by the manufactures (Huntsman Corporation).

Example 1

This example illustrates the formation of a triethoxysilyl terminated polyether. 46.0 g of 3-isocyanatopropyltriethoxysilane was added to a mixture of 400 g of amine-terminated polyoxypropylene diols (Jeffamine®XTJ510, Mw=4000, commercially available from Hutsman corporation) and 400 ml of anhydrous THF, following by vigorous stirring at ambient temperature. The completion of this reaction can be monitored by IR spectroscopy. It was observed that the strong and narrow band at 2274 $cm^{-1}$ assigned to the vibration of isocyanate group of the to 3-isocyanatopropyltriethoxysilane disappeared at the end of the reaction (approx 1 hour). Example 1 serves as an exemplar for the source of the linear polymer.

Example 2

This example illustrates the formation of a triethoxysilyl terminated polyoxypropylene. 49.47 g of 3-isocyanatopropyltriethoxysilane (Aldrich) was added to a mixture of 200 g of amine-terminated polyoxypropylene diols (Jeffamine® D2000, Mw=2000, commercially available from Hutsman corporation) and 200 ml of anhydrous THF, following by vigorous stirring at ambient temperature. The completion of this reaction can be monitored by IR spectroscopy. It was observed that the strong and narrow band at 2274 $cm^{-1}$ assigned to the vibration of isocyanate group of the to 3-isocyanatopropyltriethoxysilane disappeared at the end of the reaction (less than 0.5 hour). Example 2 serves as an exemplar for the source of the linear polymer.

Example 3

This example illustrates the formation of a polyoxypropylene modified silica aerogel monolith with 5 wt % loadings of polyoxypropylene (Mw2000). 25 g of water were added to a mixture of 52.7 g tetramethylorthosilicate (TMOS), 1.7 g of the polymer from Example 2 and 350 ml of methanol, following by 1 hour mixing at ambient temperature. The combination was gelled by addition of 0.6 g formamide and 6.0 g ammonia methanol solution (15.4 wt % ammonia). The resultant gels were first aged in ammonia ethanol solution (4.85 wt %) at ambient temperature, followed by aging in hexamethyldisilazane (5% v/v) solution for 3 days at ambient temperature. The gels remained highly transparent after $CO_2$ supercritical extraction. The average thermal conductivity of the resultant aerogel monoliths was 13.1 mW/m·K under ambient conditions, and the average density of these monoliths was 0.07 $g/cm^3$.

Example 4

The whole procedure was identical to Example 3, except for omission of the addition formamide. The resultant aerogel monoliths remained highly transparent after $CO_2$ supercritical extraction. The average thermal conductivity of the resultant aerogel monoliths was 14.2 mW/m·K under ambient conditions, and the average density of these monoliths was 0.07 $g/cm^3$.

Example 5

Figure 4:
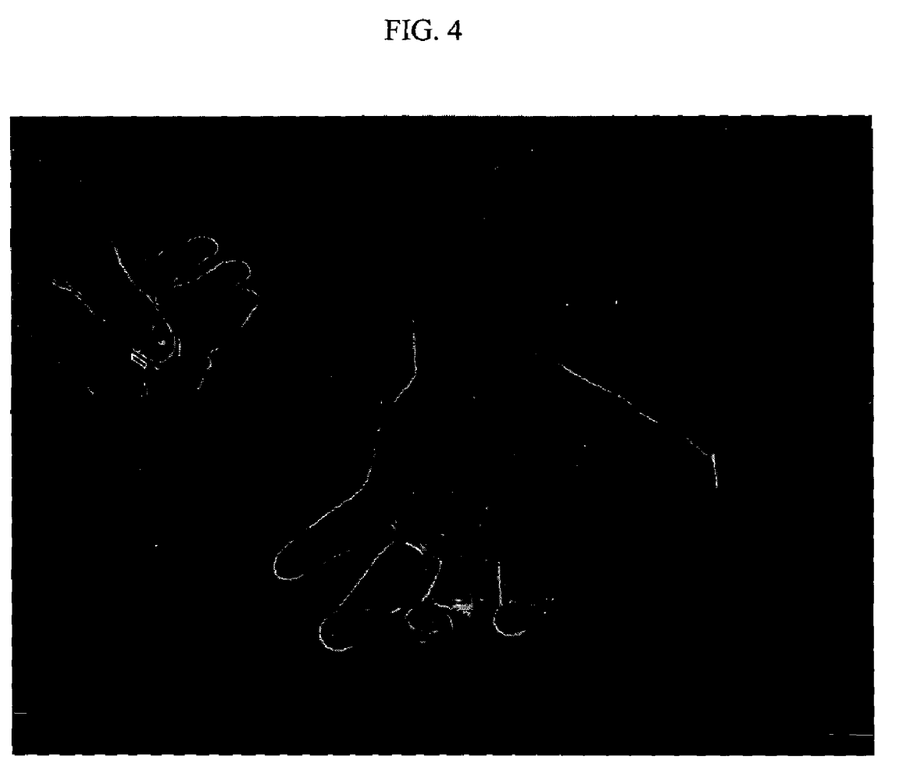
FIG. 4 is a photograph of an aerogel monolith according to Example 5.

This example illustrates the formation of a polyoxypropylene modified silica aerogel monolith with 10 wt % loadings of polyoxypropylene (Mw 2000). 23.65 g of water were added to a mixture of 50.0 g tetramethylorthosilicate (TMOS), 3.4 g of the polymer from Example 2 and 355 ml of Methanol, following by 1 hour mixing at ambient temperature. The combination was gelled by addition of 7.5 g ammonia methanol solution (15.4 wt % ammonia). The resultant gels were aged first in ammonia ethanol solution (4.85 wt %) at ambient temperature, followed by aging in an ethanol solution of hexamethyldisilazane (5% v/v) solution for 3 days at ambient temperature. The resultant aerogel monolith remained highly transparent after $CO_2$ supercritical extraction. The average thermal conductivity of the resultant aerogel monoliths was 13.4 mW/m·K under ambient conditions, and the average density of these monoliths was 0.07 g/cm$^3$. Nitrogen sorption measurement shows that the aerogel monolith of this example has a BET surface area of 633 m$^2$/g and total pore volume of 3.31 cm$^3$/g. The dimensions of the transparent, crack-free ormosil aerogel monolith of this example was 11.5×11.5×0.5 inch, as demonstrated in FIG. 4. Three point bending test shows a 10.6% flexural strain at rupture of the aerogel monolith of this example. Optical transmittance measurement on a 1.1 cm thickness aerogel of this example from the spectra of Normal/Hemispherical transmission shows 74.7% transmittance.

Example 6

This example illustrates the formation of a polyoxylpropylene modified silica aerogel monolith with 10 wt % loading of polyoxypropylene (Mw 4000). 23.65 g of water were added to a mixture of 50.0 g tetramethylorthosilicate (TMOS), 3.76 g of the polymer from Example 1 and 355 ml of methanol, following by 1 hour mixing at ambient temperature. The combination was gelled by addition of 7.5 g ammonia methanol solution (15.4 wt % ammonia). The resultant gels were first aged in ammonia ethanol solution (4.85 wt %) at ambient temperature, followed by aging in an ethanol solution of hexamethyldisilazane (5% v/v) for 3 days at ambient temperature. The resultant aerogel monolith remains highly transparent after $CO_2$ supercritical extraction. The average thermal conductivity of the resultant aerogel monoliths was 15.2 mW/m·K under ambient conditions, and the average density of these monoliths was 0.07 g/cm$^3$. Nitrogen sorption measurement shows that the aerogel monolith of this example has a BET surface area of 582 m$^2$/g and total pore volume of 3.07 cm$^3$/g. Three point bending test shows a 10.6% flexural strain at rupture of the aerogel monolith of this example. Optical transmittance measurement on a 0.5 cm thickness the aerogel monolith of this example from the spectra of Normal/Hemispherical transmission shows 90.1% transmittance.

Example 7

This example illustrates the formation of a polyoxypropylene modified silica aerogel monolith with 5 wt % loadings of polyoxypropylene (Mw 4000). 25.0 g of water were added to a mixture of 52.7 g tetramethylorthosilicate, 1.88 g of the polymer from Example 1 and 355 ml of methanol, following by 1 hour mixing at ambient temperature. The combination was gelled by addition of 6.0 g ammonia methanol solution (15.4 wt % ammonia). The resultant gels were first aged in ammonia ethanol solution (4.85 wt %) at ambient temperature, followed by aging in an ethanolic solution of hexamethodisilazane (5% v/v) solution for 3 days at ambient temperature. The resultant aerogel monoliths remained highly transparent after $CO_2$ supercritical extraction. The average thermal conductivity of the resultant aerogel monoliths was 14.5 mW/m·K under ambient conditions, and the average density of these monoliths was 0.07 g/cm$^3$.

Example 8

This example illustrates the formation of a triethoxysilyl terminated polyoxyethelene-co-polyoxypropylene resin. 40.8 g of 3-isocyanatopropyltriethoxysilane was added to a mixture of 50.0 g of amine-terminated polyoxyethelene-co-polyoxypropylene diols Jeffamine® XTJ500, Mw=600, commercially available from Hutsman corporation) and 60 ml of anhydrous THF, following by vigorous stirring at ambient temperature. The completion of this reaction can be monitored by IR spectroscopy. It was observed that the strong and narrow band at 2274 cm$^{-1}$ assigned to the vibration of isocyanate group of the 3-isocyanatopropyltriethoxysilane disappeared at the end of the reaction (approx 1 hour). Example 8 serves as an exemplary source of the linear polymer.

Example 9

This example illustrates the formation of a polyoxyethylene-co-polyoxypropylene modified silica aerogel fiber reinforced composite with 10 wt % loading of polyoxyethylene-co-polyoxyypropylene (Mw600). 9.6 g of 0.1M aqueous HCl were added to a mixture of 20.0 g Silbond®40, 1.43 g of the polymer resin from Example 8 and 150 ml of ethanol, following by 2 hour mixing at ambient temperature. The combination was mixed with 3.0 g ammonia ethanol solution (15.4 wt % ammonia) and infiltrated into a 3M G80 polyester batting fiber sheet prior to gelation (6 minutes in this example). The resultant gels were first aged in ammonia ethanol solution (4.85 wt %) at ambient temperature and subsequently in an ethanolic solution of hexamethyldisilazane (5% v/v) solution for 1 day at ambient temperature. The average thermal conductivity of the fiber-reinforced aerogel coupons was 13.1 mW/m·K under ambient conditions, and the average density of these coupons was 0.08 g/cm$^3$.

Example 10

This example illustrates the formation of a polyoxyethelene-co-polyoxylpropylene modified silica aerogel fiber reinforced composite with 20 wt % loadings of polyoxyethelene-co-polyoxylpropylene (Mw600). 9.6 g of 0.1M aqueous HCl were added to a mixture of 20.0 g Silbond®40, 3.21 g of the polymer from Example 2 and 165 ml of ethanol, following by 2 hour mixing at ambient temperature. The mixture was mixed with 3.0 g ammonia ethanol solution (15.4 wt % ammonia) and infiltrated into a 3M G80 polyester fiber batting sheet prior to gelation (8 minutes in this example). The resultant gels first aged in ammonia ethanol solution (4.85 wt %) for one day at ambient temperature, followed by aging in an ethanolic solution of hexamethyldisilazane (5% v/v) solution for 1 day at ambient temperature. The average thermal conductivity of the fiber-reinforced aerogel coupons was 16.1 mW/m·K under ambient conditions, and the average density of these coupons was 0.09 g/cm$^3$.

Example 11

This example illustrates the formation of a polyoxyethelene-co-polyoxylpropylene modified silica aerogel fiber reinforced composite with 20 wt % loadings of polyoxyethelene-co-polyoxylpropylene (Mw600). 19.2 grams of 0.1M aqueous HCl were added to a mixture of 40.0 g Dynasil®40, 6.42 g of the polymer from Example 8 and 132.5 ml of ethanol, following by 2 hours mixing at ambient temperature. After addition of 3.0 g of ammonia ethanol solution (15.4 wt % ammonia) to catalyze gelation, the mixture was infiltrated into a 3M G80 polyester fiber batting sheet (prior to gelation). The resultant gels were first aged in ammonia ethanol solution (4.85 wt %) for 1 day at ambient temperature, followed by aging for 1 day in an ethanolic solution of hexamethyldisilazane (5% v/v) at ambient temperature. The average thermal conductivity of the fiber reinforced aerogel coupons was 12.0 mW/m·K under ambient conditions, and the average density of these coupons was 0.08 g/cm$^3$.

Example 12

This example illustrates the formation of a triethoxysilyl terminated polyether from polyether polyol, 40 g of 3-isocyanatopropyltriethoxysilane (Aldrich) was added to a mixture of 200 g of polyether polyol (Arcol® R-2744, Mn=2200, commercially available from Lyondell corporation), 100 ml of anhydrous THF, and 0.05 g of dibubutyltim dilaurate. The above mixtures were fluxed at 85 to 95° C. for 8 hours. The completion of this reaction can be monitored by IR spectroscopy. It was observed that the strong and narrow band at 2274 cm$^{-1}$ assigned to the vibration of isocyanate group of the to 3-isocyanatopropyltriethoxysilane disappeared at the end of the reaction. Example 12 serves as an exemplary source of the linear polymer.

Example 13

This example illustrates the formation of a polyether modified silica aerogel fiber reinforced composite with 20 wt % loadings of polyether (Mn 2200). 17.2 g of water were added to a mixture of 72.0 g Silbond®H5, 4.94 g of the polymer from Example 12 and 125 g of ethanol, following by 1 hour mixing at ambient temperature. After addition of 3.5 g of aqueous ammonia (28-30% by weight of NH$_3$, Aldrich) and 75 g of ethanol, the mixture was infiltrated into a 3M G80 polyester batting fiber sheet prior to gelation (4.5 minutes in this example). The resultant gels were aged in an ethanolic solution of hexamethyldisilazane (5% v/v) for 1 day at ambient temperature before CO$_2$ supercritical extraction. The average thermal conductivity of the fiber-reinforced aerogel coupons was 13.7 mW/m·K under ambient conditions, and the average density of these coupons was 0.10 g/cm$^3$.

All references cited herein are hereby incorporated by reference in their entireties, whether previously specifically incorporated or not. As used herein, the terms "a", "an", and "any" are each intended to include both the singular and plural forms.

Having now fully described this invention, it will be appreciated by those skilled in the art that the same can be performed within a wide range of equivalent parameters, concentrations, and conditions without departing from the spirit and scope of the invention and without undue experimentation. While this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. An organically modified silica (ormosil) aerogel composition, said composition comprising a linear polymer covalently bonded at one or both ends to the silica network through a C—Si bond between a carbon atom of the polymer and a silicon atom of the network, wherein the linear polymer is a polyether, polyoxyalkylene, polyoxypropylene, polyoxylpropylene-copolyoxyethylene or a combination thereof.

2. The composition of claim 1 wherein the polymer is covalently bonded at both ends to one silicon containing molecule of the network or covalently bonded at the two ends to two separate silicon containing molecules of the network.

3. The composition of claim 1 wherein the weight percentage of the polymer ranges from about 1 to less than 50%, or from about 3 to about 30% w/w.

4. The composition of claim 1 wherein the linear polymer is generated from a trialkoxysilyl terminated polyoxyalkylene, trialkoxysilyl terminated polybutadiene, trialkoxysilyl terminated polyoxypropylene, trialkoxysilyl terminated polyoxypropylene-copolyoxyeth-ylene, or trialkoxysilyl terminated members of the polyether family.

5. The composition of claim 4 wherein the alkoxy groups in the terminal trialkoxysilyl moieties are selected from methoxy, ethoxy, propoxy, or butoxy.

6. The composition of claim 1 wherein the chain length of the linear polymer has an average molecular weight ranging from about 200 to about 1,000,000 or from about 300 to about 10,000.

7. A method of preparing an aerogel composition of claim 1 comprising reacting a trialkoxysilyl terminated linear polymer with a silica precursor at ambient temperature.

8. The method of claim 7 wherein said trialkoxysilyl terminated linear polymer is prepared by a method comprising reacting 3-isocyanatopropyl triethoxylsilane with hydroxy terminated linear polymer in a suitable solvent, such as a solvent free of reactive NH and OH moieties.

9. A gel composition leading to an ormosil aerogel structure comprising less than 30% linear polymer and with at least 10% transmittance or transparency in the visible spectrum per centimeter of composition, wherein the linear polymer is a polyether, polyoxyalkylene, polyoxypropylene, polyoxylpropylene-copolyoxyethylene or a combination thereof.

10. The composition of claim 9 which produces a transparent aerogel with over 95% recovery strain under 20% or less compressive strain.

11. The composition of claim 9 further comprising a fiber reinforcement.

12. The composition of claim 11 which produces a reinforced aerogel composite with thermal conductivity between about 10 and about 16 mW/mK.

13. The composition of claim 9 which produces a crack-free transparent aerogel.

14. The composition of claim 13 wherein the aerogel has thermal conductivity between about 10 and about 16 mW/mK under ambient conditions.

15. The composition of claim 1 in a particle form.

16. The composition of claim 1 wherein the linear polymer is an amine terminated polyether.

* * * * *